US010893108B2

(12) United States Patent
Jeuk et al.

(10) Patent No.: US 10,893,108 B2
(45) Date of Patent: Jan. 12, 2021

(54) MAINTAINING APPLICATION STATE OF MOBILE ENDPOINT DEVICE MOVING BETWEEN VIRTUALIZATION HOSTS BASED ON SHARING CONNECTION-BASED METADATA

(71) Applicant: Cisco Technology, Inc., San Jose, CA (US)

(72) Inventors: Sebastian Jeuk, Munich (DE); Gonzalo Salgueiro, Raleigh, NC (US); M. David Hanes, Lewisville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 1 day.

(21) Appl. No.: 16/352,474

(22) Filed: Mar. 13, 2019

(65) Prior Publication Data
US 2020/0296169 A1 Sep. 17, 2020

(51) Int. Cl.
*G06F 15/16* (2006.01)
*H04L 29/08* (2006.01)
*H04W 88/08* (2009.01)

(52) U.S. Cl.
CPC .......... *H04L 67/141* (2013.01); *H04L 67/146* (2013.01); *H04W 88/08* (2013.01)

(58) Field of Classification Search
CPC ... H04L 67/141; H04L 67/146; H04L 67/148; H04W 88/08
See application file for complete search history.

(56) References Cited

U.S. PATENT DOCUMENTS

| 7,073,073 B1 * | 7/2006 | Nonaka | G06F 21/10 713/193 |
| 7,757,059 B1 * | 7/2010 | Ofer | G06F 3/0626 711/165 |

(Continued)

OTHER PUBLICATIONS

Iyengar, et al., "QUIC: A UDP-Based Multiplexed and Secure Transport", [online], QUIC, Internet-Draft, Jun. 28, 2018, [retrieved on Jan. 10, 2019]. Retrieved from the Internet: <URL: https://tools.ietf.org/pdf/draft-ietf-quic-transport-13.pdf>, pp. 1-120.

(Continued)

*Primary Examiner* — Jonathan A Bui
(74) *Attorney, Agent, or Firm* — Leon R. Turkevich

(57) ABSTRACT

In one embodiment, a method comprises detecting, by an apparatus, establishment of a stateful application session between a mobile endpoint device and a stateful virtualized application executed by a first virtualization host in a data network, the mobile endpoint device establishing a network connection with the stateful virtualized application via a first wireless connection with a first network access point; generating, by the apparatus, a connection container comprising a connection identifier uniquely identifying the network connection, connection metadata describing the network connection, and application state metadata describing execution of the stateful virtualized application for the mobile endpoint device; and outputting, by the apparatus, the application state metadata for continuous execution of the stateful virtualized application by a second virtualization host associated with a second network access point, based on determining the mobile endpoint device connecting with the second network access point and disconnecting from the first network access point.

20 Claims, 9 Drawing Sheets

(56) References Cited

U.S. PATENT DOCUMENTS

| | | | |
|---|---|---|---|
| 8,228,954 B2 | 7/2012 | Thubert et al. | |
| 8,346,919 B1* | 1/2013 | Eiriksson | H04L 69/22 709/203 |
| 8,892,708 B2 | 11/2014 | Merrill et al. | |
| 9,116,736 B2 | 8/2015 | Shamsee et al. | |
| 9,473,570 B2 | 10/2016 | Bhanujan et al. | |
| 9,608,840 B2 | 3/2017 | Ravi et al. | |
| 9,729,406 B2 | 8/2017 | Jeuk et al. | |
| 10,057,109 B2 | 8/2018 | Shatzkamer et al. | |
| 2007/0061380 A1 | 3/2007 | Meiyyappan et al. | |
| 2007/0208711 A1 | 9/2007 | Rhoads et al. | |
| 2008/0098048 A1* | 4/2008 | Cao | G06F 16/217 |
| 2010/0150105 A1* | 6/2010 | Miao | H04L 65/1083 370/331 |
| 2011/0314561 A1* | 12/2011 | Brill | G06F 21/6209 726/29 |
| 2012/0066373 A1* | 3/2012 | Ochoa | G06F 9/4856 709/224 |
| 2013/0138791 A1* | 5/2013 | Thomas | H04L 67/148 709/223 |
| 2014/0280470 A1* | 9/2014 | Calo | H04L 67/142 709/203 |
| 2015/0088957 A1* | 3/2015 | Kuo | H04L 67/10 709/201 |
| 2015/0200872 A1 | 7/2015 | Huang et al. | |
| 2015/0229717 A1* | 8/2015 | Gupta | G06F 9/45558 718/1 |
| 2016/0255543 A1* | 9/2016 | Yadhav | H04L 67/148 370/331 |
| 2017/0195424 A1 | 7/2017 | Nasir et al. | |
| 2018/0062994 A1 | 3/2018 | Webb | |
| 2018/0097778 A1 | 4/2018 | Jain et al. | |
| 2018/0295546 A1* | 10/2018 | Crawford | H04L 67/104 |
| 2019/0342400 A1* | 11/2019 | Van Rotterdam | G06F 9/45558 |
| 2019/0387062 A1* | 12/2019 | Enat | H04L 67/148 |

OTHER PUBLICATIONS

Khademi et al., "NEAT: A Platform- and Protocol-Independent Internet Transport API", [online], IEEE Communications Magazine, Jun. 2017, [retrieved on Oct. 10, 2018]. Retrieved from the Internet: <URL: https://ieeexplore.ieee.org/stamp/stamp.jsp?arnumber=7945852>, pp. 46-54 (9 pages).

* cited by examiner

MAINTAINING APPLICATION STATE OF MOBILE ENDPOINT DEVICE MOVING BETWEEN VIRTUALIZATION HOSTS BASED ON SHARING CONNECTION-BASED METADATA

TECHNICAL FIELD

The present disclosure generally relates to maintaining application state of a mobile endpoint device moving between virtualized hosts based on sharing of connection-based metadata associated with the mobile endpoint device.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Virtualization has extended from a single application service (e.g., a virtualized operating system) to virtualization of network functions. As more network functions are virtualized and support elastic scale, the ability to perform commissioning, capacity planning, and management of devices grows increasingly complex. Moreover, deployment of virtualized network functions (vNFs) is complicated by mobility of mobile endpoint devices (e.g., a movable Internet of Things (IoT) sensor, a mobile smart phone, mobile smart vehicle, etc.), where movement of a mobile endpoint device from one coverage area into another coverage area (e.g., "handoff") can create a sub-optimal path resulting in disruption of the continued data flow between the mobile endpoint device and a stateful vNF in communication with the mobile endpoint device.

Further, an attempt to migrate an application state of the stateful vNF from a first virtualization host (associated with the first coverage area and having initiated execution of the stateful vNF with the mobile endpoint device) to a second virtualization host (associated with the second coverage area) may be inadequate given the data flow and/or velocity of the mobile endpoint device, resulting in interruption in service such as a lost connection.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
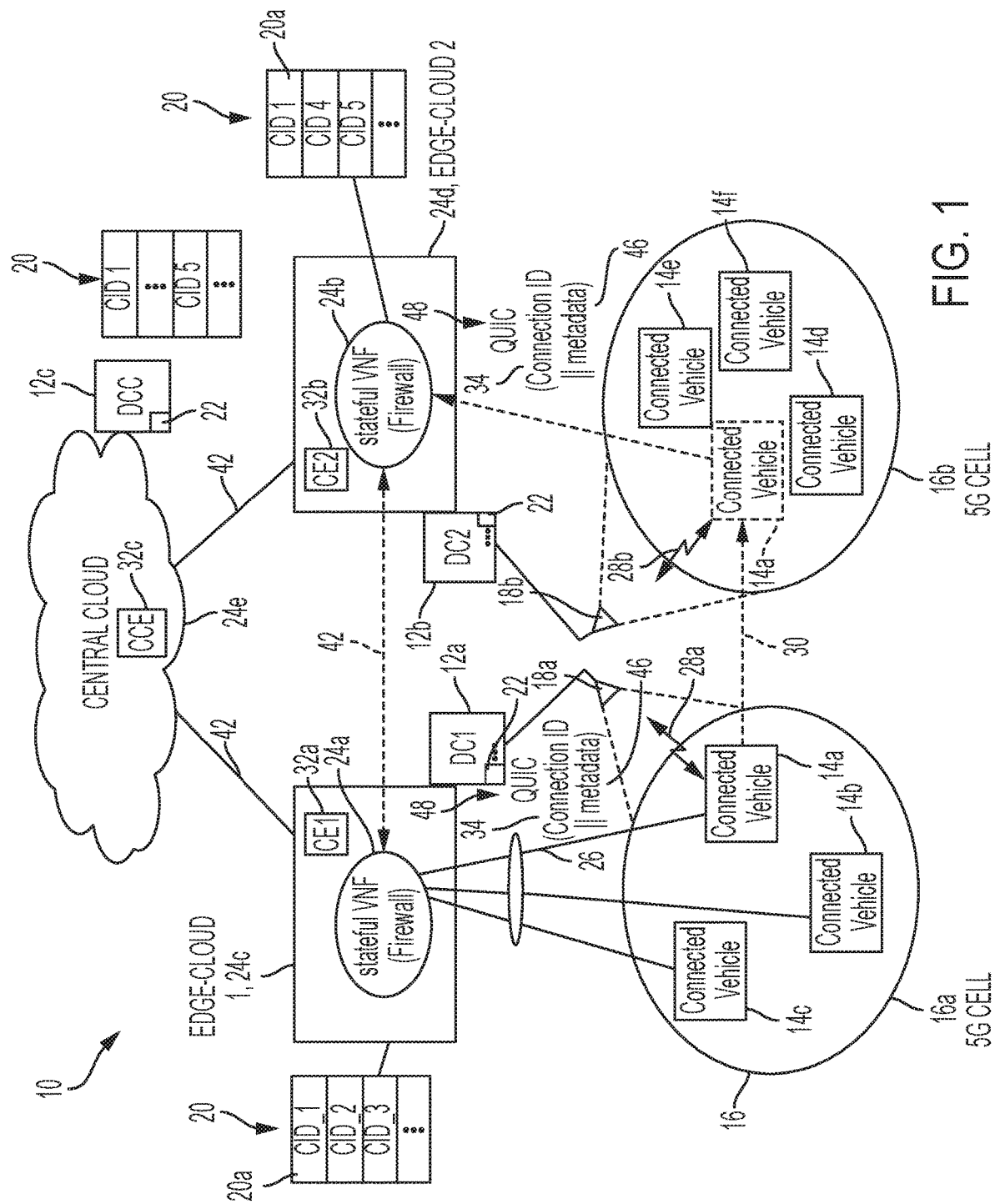
FIG. 1 illustrates an example data network having an apparatus establishing and sharing a connection identifier and associated application state data of a stateful virtualized application executed by a first virtualization host for a mobile endpoint device, for continuous execution of the stateful virtualized application by a second virtualization host as the mobile endpoint device moves in the data network, according to an example embodiment.

In one embodiment, a method comprises detecting, by an apparatus, establishment of a stateful application session between a mobile endpoint device and a stateful virtualized application executed by a first virtualization host in a data network, the mobile endpoint device establishing a network connection with the stateful virtualized application via a first wireless connection with a first network access point in the data network; generating, by the apparatus, a connection container comprising a connection identifier uniquely identifying the network connection by the mobile endpoint device with the stateful virtualized application, connection metadata associated with the connection identifier and describing the network connection and the first wireless connection, and application state metadata describing execution of the stateful virtualized application for the mobile endpoint device; and outputting, by the apparatus, the connection identifier and the associated application state metadata for continuous execution of the stateful virtualized application by a second virtualization host associated with a second network access point, based on determining the mobile endpoint device connecting with the second network access point and disconnecting from the first network access point.

In another embodiment, is implemented as a physical machine. The apparatus comprises: non-transitory machine readable media configured for storing executable machine readable code; a device interface circuit configured for receiving sending and receiving data via a data network; and a processor circuit configured for executing the machine readable code. The processor circuit, when executing the machine readable code, is operable for: detecting establishment of a stateful application session between a mobile endpoint device and a stateful virtualized application executed by a first virtualization host in the data network, the mobile endpoint device establishing a network connection with the stateful virtualized application via a first wireless connection with a first network access point in the data network; generating a connection container comprising a connection identifier uniquely identifying the network connection by the mobile endpoint device with the stateful virtualized application, connection metadata associated with the connection identifier and describing the network connection and the first wireless connection, and application state metadata describing execution of the stateful virtualized application for the mobile endpoint device, and outputting the connection identifier and the associated application state metadata for continuous execution of the stateful virtualized application by a second virtualization host associated with a second network access point, based on determining the mobile endpoint device connecting with the second network access point and disconnecting from the first network access point.

In another embodiment, one or more non-transitory tangible media is encoded with logic for execution by a machine, and when executed by the machine operable for: detecting, by the machine, establishment of a stateful application session between a mobile endpoint device and a stateful virtualized application executed by a first virtualization host in a data network, the mobile endpoint device establishing a network connection with the stateful virtualized application via a first wireless connection with a first network access point in the data network; generating, by the machine, a connection container comprising a connection identifier uniquely identifying the network connection by the mobile endpoint device with the stateful virtualized application, connection metadata associated with the connection identifier and describing the network connection and the first wireless connection, and application state metadata describing execution of the stateful virtualized application for the mobile endpoint device; and outputting, by the machine, the connection identifier and the associated application state metadata for continuous execution of the stateful virtualized application by a second virtualization host associated with a second network access point, based on determining the mobile endpoint device connecting with the second network access point and disconnecting from the first network access point.

DETAILED DESCRIPTION

Particular embodiments maintain application state between a mobile endpoint device in a data network and a stateful virtualized application as the mobile endpoint device moves between domains requiring execution of the stateful virtualized application to be moved between virtualization hosts in the respective domains of the data network. The particular embodiments maintain the application state, as the mobile endpoint device moves between domains, based on an executable connection resource (also referred to as a "connection engine" or "connection resource") executed by a machine in the data network: the "connection engine" generates and stores a connection container that comprises a connection identifier, connection metadata, and application state metadata. The connection identifier uniquely identifies the network connection by the mobile endpoint device with the stateful virtualized application executed in a first domain. The connection metadata is associated with the connection identifier and describes the network connection and a first wireless connection with a first network access point in the first domain (e.g., first cellular coverage area). The application state metadata describes execution of the stateful virtualized application for the mobile endpoint device.

Hence, the example embodiments can maintain the application state of the mobile endpoint device based on the connection engine determining the mobile endpoint device is (or will be) connecting with a second network access point in a second domain and disconnecting from the first network access point in the first domain. The connection engine can maintain the application state of the mobile endpoint device based on the connection engine outputting the connection identifier and the associated application state metadata to a second virtualization host in the second domain, for continuous execution of the stateful virtualized application by the second virtualization host as the mobile endpoint device moves from the first domain to the second domain.

Hence, the example embodiments enable scalable portability of application state in stateful virtualized applications (e.g., virtualized network functions ("vNFs")) between virtualization hosts within respective different domains of a data network as a mobile endpoint device moves between the different domains, guaranteeing continuous execution of the stateful virtualized application based on sharing the connection identifier (uniquely identifying the existing network connection by the mobile endpoint device with the stateful virtualized application) and the associated application state metadata (describing the execution of the stateful virtualized application) with the different virtualization hosts.

FIG. 1 is a diagram illustrating an example data network 10 deployed as a cloud-based computing system having one or more computing devices 12 implemented as one or more physical distributed computing systems (e.g., data centers) comprising hardware-based virtualization host devices 22 (also referred to as "virtualization hosts"), for maintaining application state of mobile endpoint devices 14 moving between virtualization hosts 22 based on sharing connection metadata 20 associated with the application state of a stateful virtualized application (e.g., stateful vNF) 24, according to an example embodiment. As illustrated in FIG. 1, the cloud-based computing system 10 can be implemented as a fifth-generation ("5G") cellular mobile communications system providing wireless communications and data services for the mobile endpoint devices 14 via prescribed wireless coverage areas (e.g., "5G cell") 16a, 16b provided by the respective physical data centers 12. Each physical data center 12 can include one or more wireless network access point devices (e.g., 18a, 18b) configured for generating a prescribed wireless coverage area 16. Each mobile endpoint device 14 can be implemented, for example, as a connected vehicle having a wireless gateway configured for wireless communications within a prescribed wireless coverage area 16, a handheld smart phone having multiple transceivers for different wireless communications (e.g., 5G, WiFi, WiFi Direct, Bluetooth, LTE, etc.), etc.

Each physical data center 12 includes a plurality of virtualization hosts 22 configured for executing one or more stateful virtualized applications 24. Each virtualization host 22 can be implemented, for example, using a commercially-available Cisco® Virtualized Infrastructure Manager (VIM), a commercially-available Cisco® Unified Computing System (UCS), a commercially-available Cisco® Nexus Series 9000 switch, and/or a commercially-available Cisco® Meeting Server (CMS) 1000, commercially available from Cisco Systems, San Jose, Calif., when configured and modified as described herein.

As illustrated in FIG. 1, the cloud-based computing system 10 can be deployed to provide a distributed deployment of virtualized network functions 24, including for example stateful virtualized firewalls 24a, 24b, stateful edge clouds 24c, 24d providing 5G-based telecommunications service for respective prescribed wireless coverage areas 16, and a central management cloud 24e. In other words, each physical data center 12 is configured for executing one or more virtualized network functions 24 based on physical, logical, computational, and/or topological requirements, in order to provide different virtualized network services based on prescribed storage, compute, and network requirements. The different virtualized network services can be combined to provide various integrated services, for example a virtualized Infrastructure as a Service (IaaS), a virtualized Platform as a Service (PaaS), and/or a virtualized Software as a Service (SaaS).

As illustrated in FIG. 1A, the physical data center 12a includes one or more virtualization hosts 22 configured for providing different virtualized services within the edge cloud 24c based on executing the stateful virtualized applications 24a, 24c and other vNFs (not shown, for example virtualized load balancer service, virtualized VPN service, virtualized routing service, etc.). Hence, the physical data center 12a has an associated wireless network access point device 18a (e.g., a 5G cell transceiver tower) providing the prescribed wireless coverage area 16a, and therefore can establish a stateful application session between a mobile endpoint device 14a within the prescribed wireless coverage area 16a and a stateful virtualized application (e.g., a virtualized firewall) 24a executed by one or more virtualization hosts 22 in the physical data center 12a. The mobile endpoint device 14a can establish a network connection 26 with the stateful virtualized application 24a via a first wireless connection 28a with the wireless network access point device 18a.

As illustrated in FIG. 1, however, the mobile endpoint device 14 may move at event 30 from the prescribed wireless coverage area 16a to the prescribed wireless coverage area 16b that is controlled by the edge cloud 24d provided by the physical data center 12b. Hence, a concern arises that the connecting of the mobile endpoint device 14a with the wireless network access point device 18b via a second wireless connection 28b in conjunction with (soft handoff), or separate from (hard handoff), from the mobile endpoint device 14a disconnecting from the wireless network access point device 18a via the wireless connection 28a (e.g., due to lost signal or deteriorated signal, reduced RSSI, increased bit error rate, etc.), can cause a disruption in service since the physical data center 12b has not yet established an instance of a stateful application session in the stateful virtualized application 24b for the mobile endpoint device 14a.

According to an example embodiment, each physical data center 12 is configured for executing an executable instance of a connection resource 32 associated with a prescribed domain: as illustrated in FIG. 1, the connection resource "CE1" 32a is associated with a computing domain established by the edge cloud 24c; the connection resource "CE2" 32b is associated with a computing domain established by the edge cloud 24d; and the connection resource "CCE" 32c is associated with the computing domain established by the central cloud 24e.

Each connection resource 32 is configured for generating and storing in a memory circuit of the corresponding physical data center 12 executing the connection resource 32 a connection metadata container 20 associated with a mobile endpoint device 14 and its corresponding network connection 26 with a stateful virtualized application 24. As illustrated with respect to FIG. 7, a connection resource 32 can generate and store in a memory circuit a connection metadata container 20 that comprises a connection identifier 34, connection metadata 36, and application state metadata 38. The connection metadata container 20 also can include endpoint device metadata 40.

The connection identifier 34 generated by the connection resource 32 uniquely identifies the network connection 26 by the mobile endpoint device 14 with the stateful virtualized application 24a executed in a first domain (e.g., in the edge cloud 24c). The connection metadata 36 generated by the connection resource 32 is associated with the connection identifier 34 and describes the network connection 26 and a first wireless connection 28a with a first network access point 18a in the first domain 24c providing the prescribed wireless coverage area 16a.

The application state metadata 38 generated by the connection resource 32 describes execution of an instance of the stateful application session that is executed by the stateful virtualized application for the mobile endpoint device. The endpoint device metadata 40 can describe hardware and/or software based features of the mobile endpoint device 14 that are relevant to execution of the stateful application session executed by the stateful virtualized application 24. Also note that least a portion of any of the metadata described herein can be generated by any one of the mobile endpoint device 14 or the stateful virtualized application 24 during execution of the stateful application session via the network connection 26, or by the current connection resource 32 monitoring execution of the stateful virtualized application 24, a prior connection resource 32 having previously monitored execution of the stateful virtualized application 24 in a prior domain (e.g., a different prescribed wireless coverage area 16) visited by the mobile endpoint device 14, or a future connection resource 32 (e.g., 32b) that is predicted to receive the mobile endpoint device 14 within its domain (e.g., the prescribed wireless coverage area 16b).

Hence, in response to the connection resource 32 (e.g., 32a) detecting and/or predicting (e.g., from GPS location, a determined sequence of access points 18 within the prescribed wireless coverage area 16a, etc.) that the mobile endpoint device 14a is moving from the prescribed wireless coverage area 16a and into the prescribed wireless coverage area 16b, the connection resource 32a can output at least a portion of the connection metadata container 20a associated with the network connection 26 between the mobile endpoint device 14a and the stateful virtualized application 24a executing the stateful application session. In particular, the connection resource 32a can output at least a portion of the connection metadata container 20a via one or more data links 42 to the connection resource 32b and/or the connection resource 32c executed by one or more of the virtualization hosts 22 in the physical data center 12b and/or physical data center 12c, respectively. The receiving connection resource 32c can forward the received connection metadata container 20 (or portion thereof) to the connection resource 32b for establishment of the same instance of the stateful application session in the stateful virtualized application 24b executed by one or more virtualization hosts 22 in the physical data center 12b based on the received connection metadata container 20 (or portion thereof) for the mobile endpoint device 14a. Hence, the coordinated transfer between the connection resources 32a, 32b, and 32c of the connection metadata container 20a associated with the mobile endpoint device 14a in communication with a stateful virtualized application 24 causes guaranteed continuous execution of the stateful virtualized application 24 among the different edge clouds 24c, 24d as the mobile endpoint device 14a moves from the prescribed wireless coverage area 16a associated with the domain of edge cloud 24c to the prescribed wireless coverage area 16b associated with the domain of the edge cloud 24d.

Figure 2:
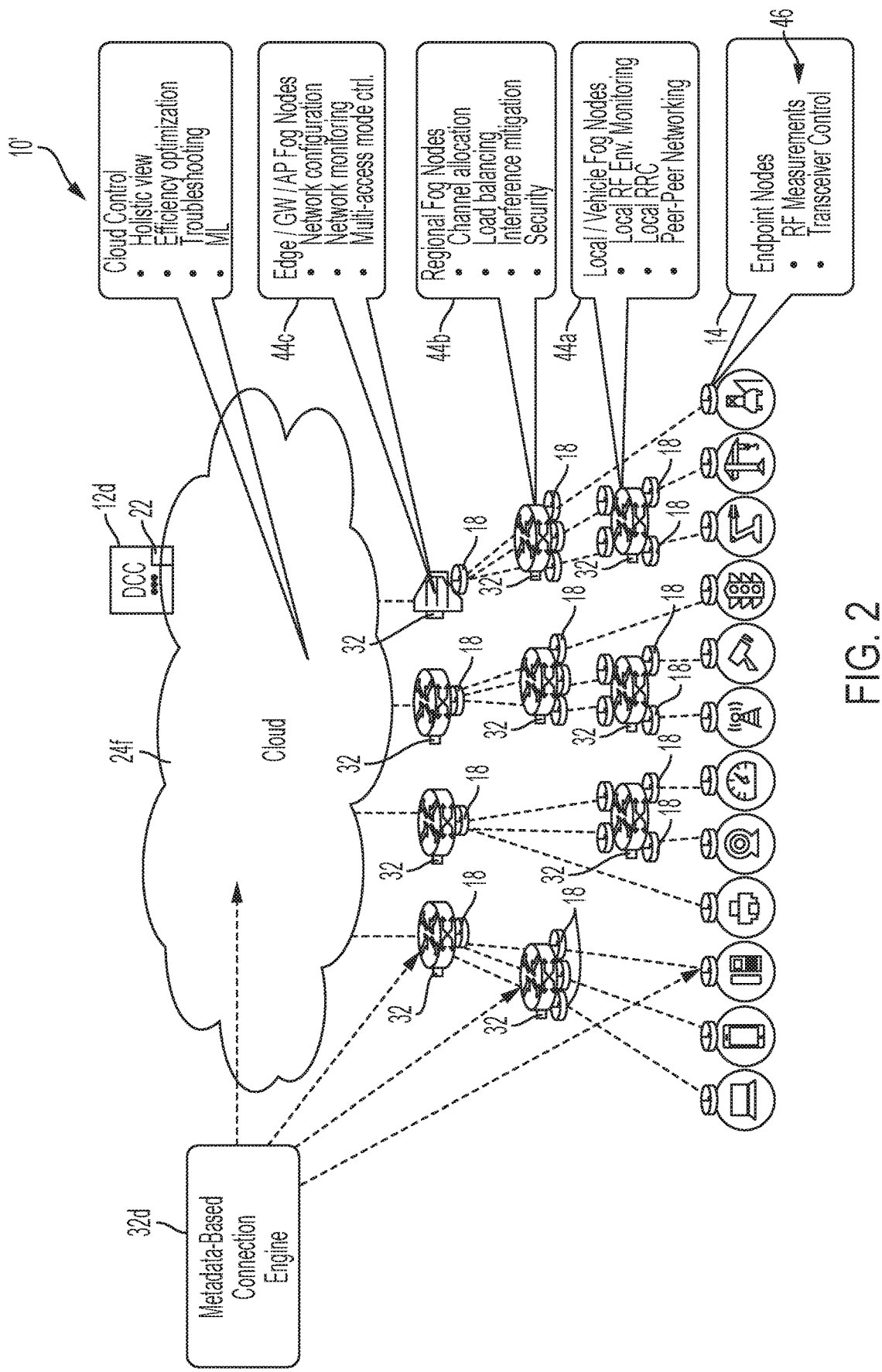
FIG. 2 illustrates a second example data network having an apparatus for establishing and sharing the connection identifier and associated application state data of the stateful virtualized application, for continuous execution of the stateful virtualized application by a different virtualization host as the mobile endpoint device moves in the data network, according to an example embodiment.

FIG. 2 illustrates another example cloud-based computing system 10' that is deployed for communication with "Internet of Things" (IoT) based mobile endpoint devices 14 via a hierarchy of fog node devices 44. The cloud-based computing system 10' of FIG. 2 includes a physical data center 12d comprising one or more virtualization hosts 22 configured for virtualized execution of the centralized cloud resource 24f. The cloud-based computing system 10' includes a hierarchical deployment of "fog node devices" 44, where each fog node device 44 can execute a corresponding connection resource 32 that can provide at least a shared portion of the generating, updating, and sharing (e.g., selective synchronization) of one or more connection metadata containers 20 as the associated mobile endpoint devices 14 move between different wireless network access point devices 18 implemented among the fog node devices 44.

As illustrated in FIG. 2, the cloud-based computing system 10' can include local/vehicle fog node devices 44a deployed in mobile vehicles (e.g., a connected vehicle 14 as illustrated in FIG. 1). An example local/vehicle fog node device 44a is the commercially-available Cisco® 829 Industrial Integrated Services Router from Cisco Systems. Each mobile endpoint device 14 in FIGS. 1 and 2 can be configured for collecting and sending its own device-initiated metadata 46 such as telemetry-based metadata (e.g., GPS position, device velocity, transceiver control settings) and device-based metadata (e.g., battery power, battery lifetime, device type, device firmware/software revision, etc.), cognitive radio and/or RF telemetry capabilities, etc., for example within a device update message (48 of FIG. 1) that also can specify the connection identifier 34 that uniquely identifies the network connection 26 by the mobile endpoint device 14 with the stateful virtualized application 24. Each local/vehicle fog node device 44a can execute a corresponding connection resource 32 that can supply, for a corresponding connection metadata container 20 associated with a mobile endpoint device 14, local RF environmental metadata, local Radio Resource Control (RRC) settings for UMTS and/or LTE-based communications system (or any other GSM/3GPP-related communication protocol), and any metadata associated with peer-to-peer networking between other reachable local/vehicle fog node devices 44a. The local/vehicle fog node devices 44a can be considered as "low-level" or "vehicle" fog nodes in the fog node hierarchy.

The cloud-based computing system 10' also can include regional fog node devices 44b, considered "intermediate fog nodes" in the fog node hierarchy, each of which can execute a corresponding connection resource 32 that can collect metadata from the mobile endpoint devices 14 and/or one or more local/vehicle fog node devices 44a, and generate its own metadata describing regional fog node attributes such as channel allocation, load balancing, interference mitigation, security, etc.

The cloud-based computing system 10' also can include network edge fog nodes 44c, considered "high level fog nodes" in the fog node hierarchy of FIG. 2. Each network edge fog node device 44c can execute a corresponding connection resource 32 that can collect metadata from any one of a mobile endpoint device 14, a local/vehicle fog node device 44a, a regional fog node device 44b, and/or generate its own associated metadata describing network configuration, network monitoring, multi-access mode control, etc.

Hence, the connection resources 32 of FIG. 2 can execute coordinated generating, updating, sharing, and selective synchronization according to the aggregation hierarchy of the associated fog node devices 44. The connection resource 32d can collect the metadata from any one or more of the mobile endpoint devices 14, the local/vehicle fog node devices 44a, the regional fog node devices 44b, and/or the network edge fog node devices 44c, and/or generate network-wide metadata describing a "holistic view" of the cloud-based computing system 10' with respect to network health, efficiency optimization, troubleshooting, machine learning, etc. As such the connection resource 32d associates the metadata received from any of the devices 14, 44a, 44b, 44c with one or more connection identifiers 34, as appropriate. As apparent from the foregoing, the connection resource 32 can operate in a centralized manner or can provide distributed execution that is coordinated with the other connection resources 32 executed in any local/vehicle fog node device 44a, any regional fog node device 44b, and/or any network edge fog node device 44c.

Figure 3:
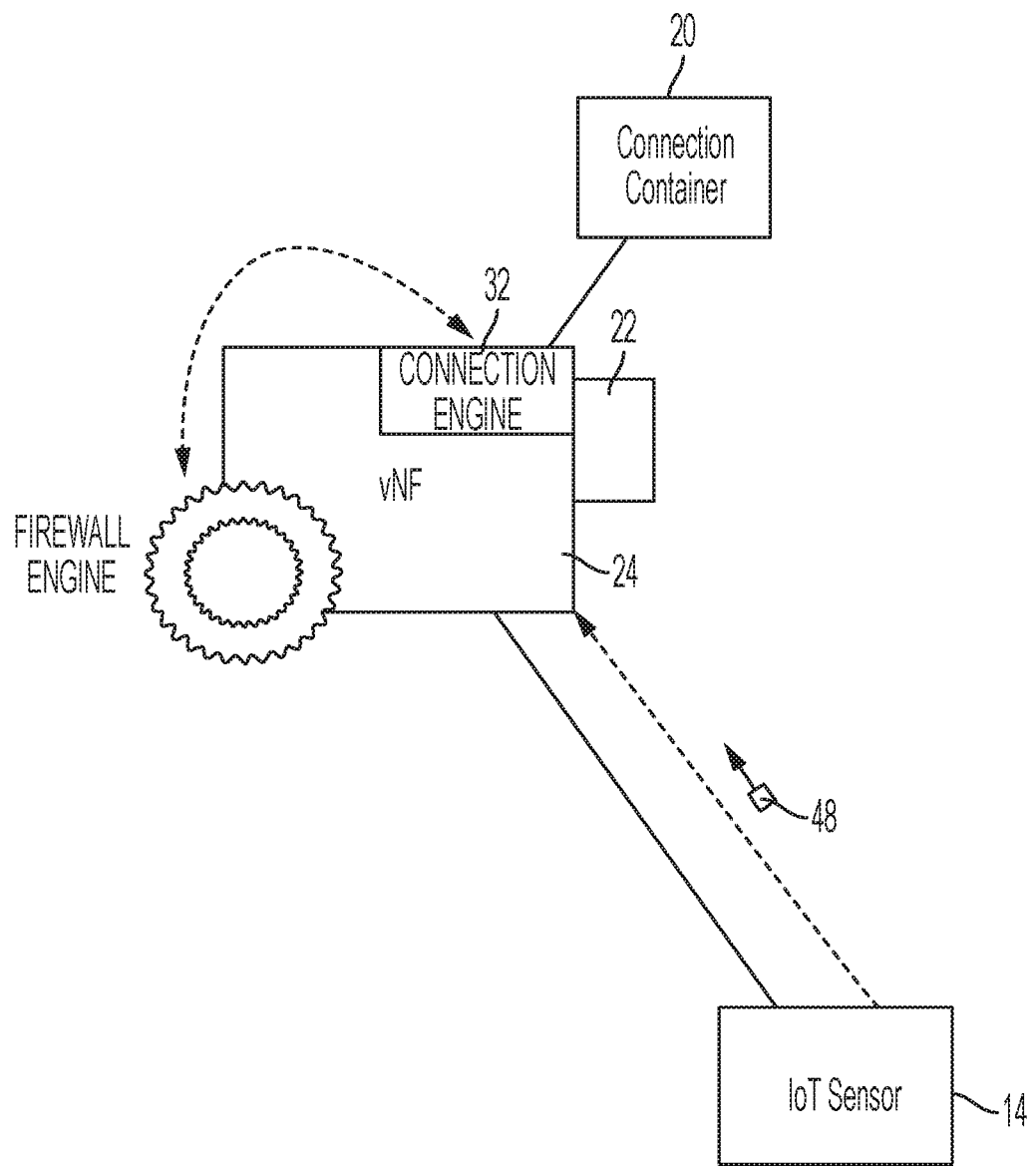
FIG. 3 illustrates in further detail operations executed between the mobile endpoint device, a virtualized network function, and one or more of the connection resources in FIGS. 1 and/or 2, according to an example embodiment.

FIG. 3 illustrates in further detail a mobile endpoint device 14 establishing a network connection 26 with a stateful virtualized application 24, illustrated for example as a "virtualized firewall engine", and one or more of the connection resources 32 detecting establishment of a stateful application session between the mobile endpoint device 14 and the stateful virtualized application 24 via the network connection 26. Each virtualized network element 24 in the cloud-based computing system 10 and/or 10' can be configured for registering with its local connection resource 32 (within the same virtualization domain) upon instantiation of the virtualized element, thereby establishing communications between the connection resource 32 and each local stateful virtualized application 24 within the associated virtualization domain.

As described in further detail below, the connection resource 32 (executed by a virtualization host 22 within a physical data center 12), in response to detecting establishment of the stateful application session between the mobile endpoint device 14 and the stateful virtualized application 24 via the network connection 26, can generate a connection metadata container 20. The connection metadata container 20 comprises a connection identifier 34 that uniquely identifies the network connection 26 between the mobile endpoint device 14 and the stateful virtualized application 24, connection metadata 36 that is associated with the connection identifier 34 and describing network-based attributes (e.g., Internet Protocol (IP) based attributes) of the network connection 26 and link layer attributes of the wireless connection 28, and application state metadata 38. The application state metadata 38 can specify application state variables associated with execution of the stateful virtualized application 24, including for example vNF identifier, application state identifier, session identifier, etc. The connection identifier 34 and/or the connection metadata 36 can be generated dynamically by the mobile endpoint device 14, the stateful virtualized application 24, and/or the connection resource 32 in response to setup and/or establishment of the network connection 26; for example, the connection identifier 34 and/or the connection metadata 36 can be generated by the connection resource 32 (and/or the mobile endpoint device 14 and/or the stateful virtualized application 24, as appropriate) based on a device update message 48 such as a QUIC packet generated according to the Internet Engineering Task Force (IETF) Internet Draft by Iyengar, Ed., et al., entitled "QUIC: A UDP-Based Multiplexed and Secure Transport" (draft-ietf-quic-transport-13); the connection identifier 34 and/or the connection metadata 36 also can be generated based on a 5-Tuple value (e.g., Source/Destination IP, Source/Destination Port Number, Protocol Number specifying protocol in use) or 3-Tuple (Source/Destination IP address, Protocol Number); the connection identifier 34 and/or the connection metadata 36 also can be generated based on a Universal Cloud Classification (UCC) value as described in U.S. Pat. No. 9,729,406 by Jeuk et al., entitled "Cloud Provider, Service, and Tenant Classification in Cloud Computing"; other methods also can be used for generating the connection identifier 34 and/or the connection metadata 36.

The connection metadata 36, the application state metadata 38, and/or the endpoint device metadata 40 can be supplied by the mobile endpoint device 14 directly in-band via the corresponding wireless connection 28 and/or network connection 26 to the stateful virtualized application 24 and/or the connection resource 32, for example using a device update message 48 such as an in-situ Operations, Administration, and Maintenance (iOAM) message; alternately, different network components can detect or different components of the metadata collected in the connection metadata container 20; for example, relevant metadata can be supplied to the connection resource 32 by any one or more of a wireless network access point device 18 (e.g., a cell tower reporting wireless, geographical and/or environmental metadata), an edge cloud (e.g., 24c), etc. Virtualized network elements (e.g., load balancer, VPN, etc.) within the edge cloud (e.g., 24c) also can send metadata to the connection resource 32 in response to events associated with the mobile endpoint device 14.

The connection resource 32 is configured for storing in the connection metadata container 20 (for the execution of the stateful virtualized application 24 for the identified mobile endpoint device 14) the metadata associated with the specific connection identifier 34, the connection metadata 36, the application state metadata 38, and the endpoint device metadata 40. Hence, the connection resource 32 can supply all relevant metadata to the stateful virtualized application 24 as needed for the execution of the stateful application session by the stateful virtualized application 24. The stateful virtualized application 24 can exchange metadata with the connection resource 32 in response to changes in application state during execution of the stateful virtualized application for the mobile endpoint device 14, and the mobile endpoint device 14 can forward metadata to the connection resource 32 and/or the stateful virtualized application 24 in response to any changes detected by the mobile endpoint device 14. The stateful virtualized application 24 also can request metadata associated with the network connection 26 from the mobile endpoint device 14, causing the mobile endpoint device 14 to supply the requested metadata; the stateful virtualized application 24 can apply the received metadata to execute application operations. Hence, the connection resource 32 can continually update the connection metadata container 20 in response to any changes in state encountered by the stateful virtualized application 24 and/or the mobile endpoint device 14.

As described below, the stateful virtualized application 24 also can request from the connection resource 32 (e.g., 32b) specific metadata associated with an identified network connection 26, for example in response to detecting a new connection established by a new mobile endpoint device 14 entering a prescribed wireless coverage area 16: the connection resource 32 can respond to the request from the stateful virtualized application 24, for example based on sending a query to a connection resource 32c and/or a peer connection resource (e.g., 32a) based on connection metadata describing the new network connection 26 and/or describing the mobile endpoint device 14 establishing the new network connection 26. The receiving connection resource 32 (e.g., 32c or 32a), in response to detecting the new mobile endpoint device 14 by associating the metadata specified in the request with the corresponding connection identifier 34, can respond to the query by sending a reply specifying at least a portion of the connection resource 32 (e.g., the connection identifier 34 and the associated application state metadata 38) to the requesting connection resource 32 (e.g., 32b).

Hence, the requesting connection resource 32 (e.g., 32b) can respond to receiving the reply from the responding connection resource 32 by forwarding the metadata to the requesting stateful virtualized application 24, causing the requesting stateful virtualized application 24 to create a "mirror" application state that causes continuous execution of the stateful virtualized application 24 by the associated virtualization host 22. The connection resource 32 as illustrated in FIG. 3 also can be embedded with the stateful virtualized application 24.

Figure 4:
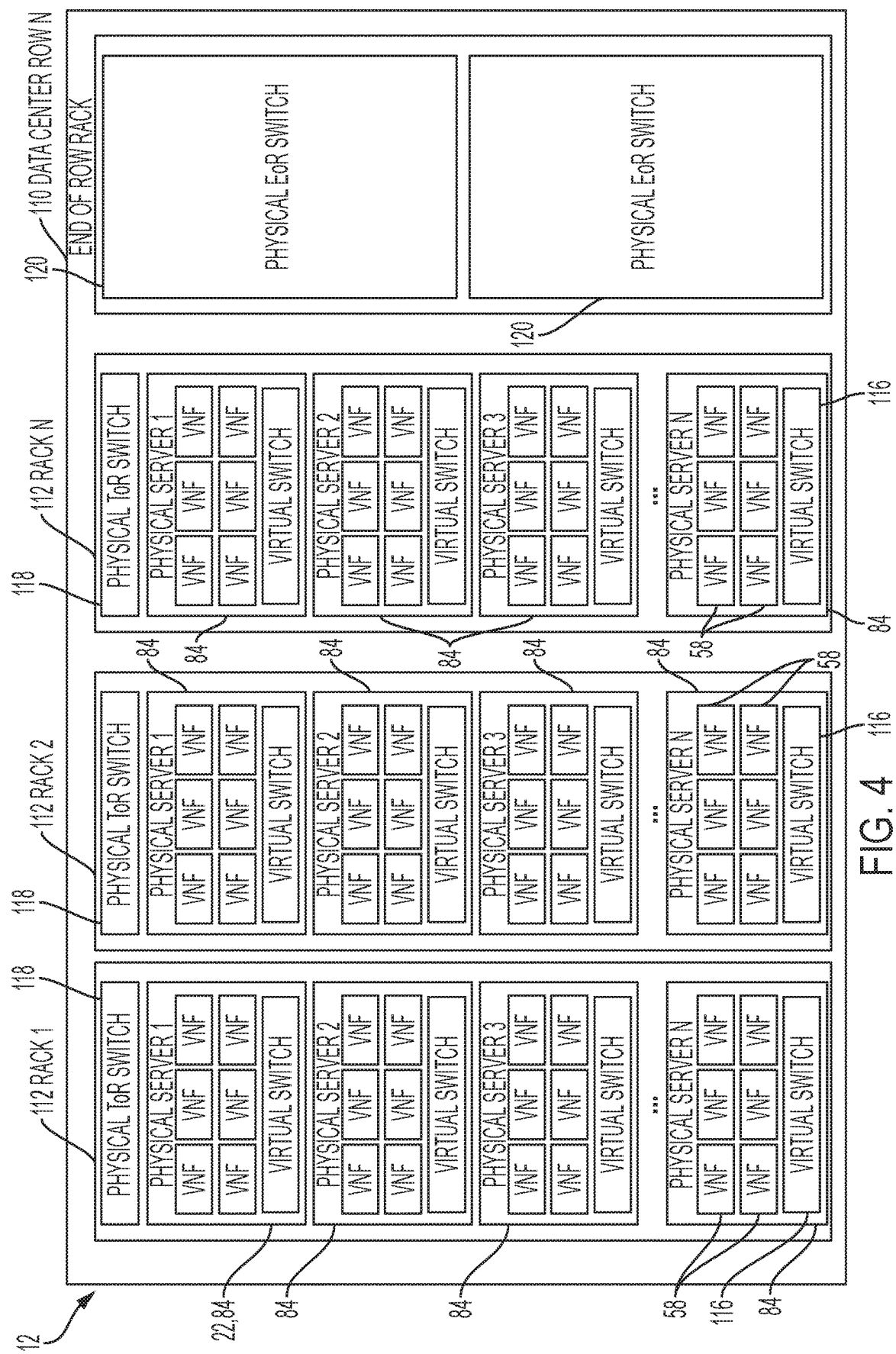
FIG. 4 illustrates an example implementation of any one of the data centers of FIG. 1, according to an example embodiment.

FIG. 4 illustrates an example implementation of any one of the data centers 12 of FIG. 1 comprising one or more virtualization hosts 22, according to an example embodiment. In particular, FIG. 4 illustrates an example implementation of a single row 110 of a physical data center 12 having multiple physical rows 110 and that can implement the example embodiments. The following description of a data center that can implement virtualized network functions and virtualized network services according to example embodiments can help illustrate the complexity of allocating virtualized network functions for a virtualized network service, and the benefit of applying the connection resource 32 for coordinating transfer of metadata for continuous execution of a stateful virtualized application 24 (58 in FIG. 4) between virtualization hosts 22 in different physical data centers 12.

Data center rooms typically are organized in multiple rows 110, with multiple physical racks 112 per row 110. Each physical rack 112 typically contains multiple physical servers 84, each representing physical resources upon which an orchestrator (not shown) can place (i.e., allocate, assign, etc.) a VNF (e.g., 24). Each server 84 represents a corresponding virtualization host 22 in the Figures. Each server 84 also has a virtual switch (Vswitch) 116 configured for providing localized connections to (and between) the VNFs that reside on the physical server 84. Each rack 112 can include (e.g., at the top of the rack) a physical "Top of Rack" (ToR) switch 118, which provides the rack-level connectivity to (and between) the VNFs 24 that reside on different physical servers 84 within the corresponding rack 112. A multitude of racks 112 together comprise a row 110. Each row 110 in a data center can include at least one physical End of Row (EoR) switch 120, which provides aggregation of all ToR switches 118 and provides row-level connectivity for VNFs 24 that reside within the row on different racks 112.

The physical resources (e.g., compute, memory, and/or network) that are consumed to provide a virtualized network service are based on the placement of the associated VNFs 24 within the data center; in other words, more network resources are required to provide a virtualized network service if interdependent VNFs are placed within physical servers 84 that are further apart topologically within a data center, Ideally, all VNFs 24 for a particular virtualized service would reside on the same physical server 84, such that the communication flows between the VNFs 24 of the same service would be limited to only involve the Vswitch 116 in the same physical server 84; however, placement of all VNFs 24 associated with a particular virtualized service within a single physical server 84 may not always be possible due to limited resources within the single physical server 84/22.

The next ideal scenario is for all VNFs 24 associated with a particular service to reside on the same physical rack (e.g., "Rack 2") 112, which limits communication flow between VNFs 24 of the same virtual service to involve the corresponding ToR switch 118 for that rack (e.g., "Rack 2") 112, and the number N×V switches 116 associated with the servers 84 for the N VNFs 24. However, because there are limited resources within a single rack 112, allocating all VNFs 24 within a single rack 112 may not always be possible.

A less ideal scenario is when VNFs 24 associated with a particular virtualized service reside on different racks (e.g., "Rack 1" and "Rack N") 112 within the same row 110. The communication flow between the VNFs 24 for the same virtual service now involve the EoR switch 120 for that row 110, MxToR 118 switches (one for each rack 112 containing an associated VNF 24) and N×V switches 116 associated with the servers 84 for the N VNF 24. However, because there are limited resources within a single row 110, this allocation within a single row 110 may not always be possible.

An even less ideal scenario is when VNFs 24 associated with a particular virtualized network service reside on different rows 110 within the same data center 12. The communication flow between the VNFs associated with the same virtual service now involve LxEoR switches 120 (one for each row 110 containing an associated VNF 24), MxToR switches 118 (one for each rack 112 containing an associated VNF 24), and N×V switches 116 associated with the physical servers 84 for the N VNFs 24.

An orchestrator (not shown) is responsible for limiting the number of physical resources involved in the implementation of the virtual service, and ensure that interdependent VNFs 24 are located in such a way to minimize implications to ToR switches 112 and EoR switches 120 (i.e., minimize the use of the ToR switches 112 and/or EoR switches 120 for execution of a given virtualized network service). In the case of a distributed architecture that utilizes multiple physical data centers connected by wide area network (WAN) circuits, the management by the orchestrator becomes even more complex. Hence, coordination between different connection resources 32 ensures coordinated interoperability between different physical data centers 12 as a stateful application session for a stateful virtualized application 24 needs to moved to a different physical data center 12 as a mobile endpoint device 14 moves from one domain (e.g., prescribed wireless coverage area 16a) associated with one physical data center 12 to another domain (e.g., prescribed wireless coverage area 16b) associated with another physical data center 12. Additional details regarding cloud-based deployments can be found, for example, in U.S. Pat. Nos. 8,892,708, 9,473,570, 9,729,406, 10,057,109, U.S. Pub. 2015/0200872, etc.

Figure 5:
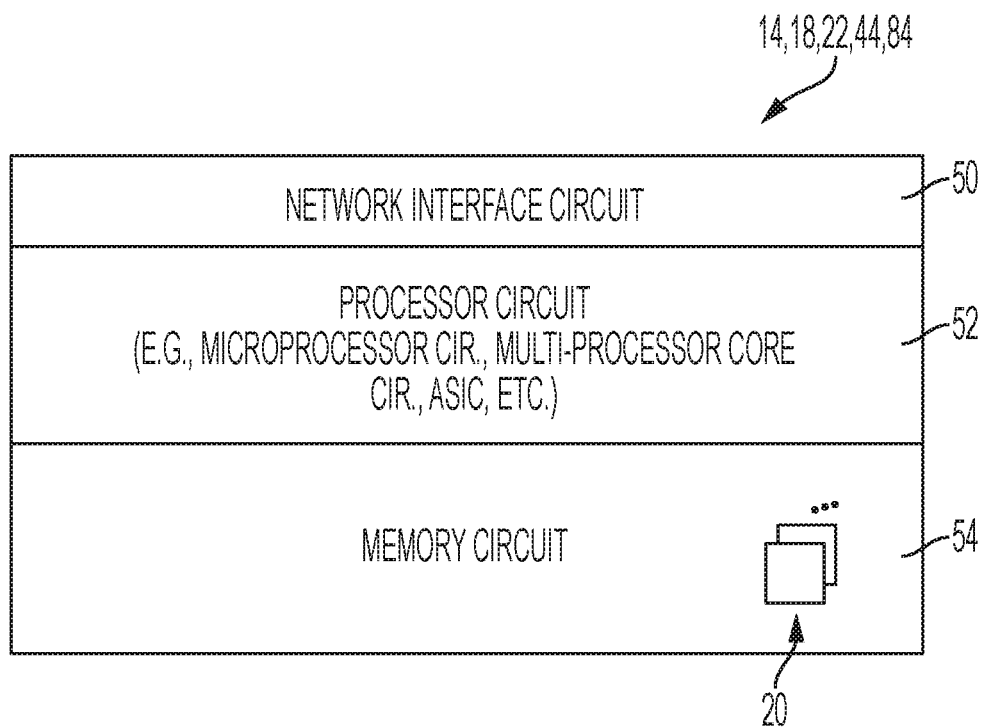
FIG. 5 illustrates in further detail an example implementation of any one of the devices in FIGS. 1-4, according to an example embodiment.

FIG. 5 illustrates in further detail an example implementation of any one of the devices described herein, including a mobile endpoint device 14, a wireless network access point device 18, a virtualization host 22, a fog node device 44, a server 84, etc., according to an example embodiment.

Each apparatus 14, 18, 22, 44, and/or 84 is a physical machine (i.e., a hardware device) configured for implementing network communications with other physical machines via the network 10. The term "configured for" or "configured to" as used herein with respect to a specified operation refers to a device and/or machine that is physically constructed and arranged to perform the specified operation. Hence, each apparatus 14, 18, 22, 44, and/or 84 is a network-enabled machine implementing network communications via the network 10.

Each apparatus 14, 18, 22, 44, and/or 84 can include a device interface circuit 50, a processor circuit 52, and a memory circuit 54. The device interface circuit 50 can include one or more distinct physical layer transceivers for communication with any one of the other devices 14, 18, 22, 44, and/or 84; the device interface circuit 50 also can include an IEEE based Ethernet transceiver for communications with the devices of FIG. 1 via any type of data link (e.g., a wired or wireless link, an optical link, etc.). The processor circuit 52 can be configured for executing any of the operations described herein, and the memory circuit 54 can be configured for storing any data or data packets as described herein.

Any of the disclosed circuits of the devices 14, 18, 22, 44, and/or 84 (including the device interface circuit 50, the processor circuit 52, the memory circuit 54, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 54) causes the integrated circuit (s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 54 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 54 can be implemented dynamically by the processor circuit 52, for example based on memory address assignment and partitioning executed by the processor circuit 52.

Figure 6A:
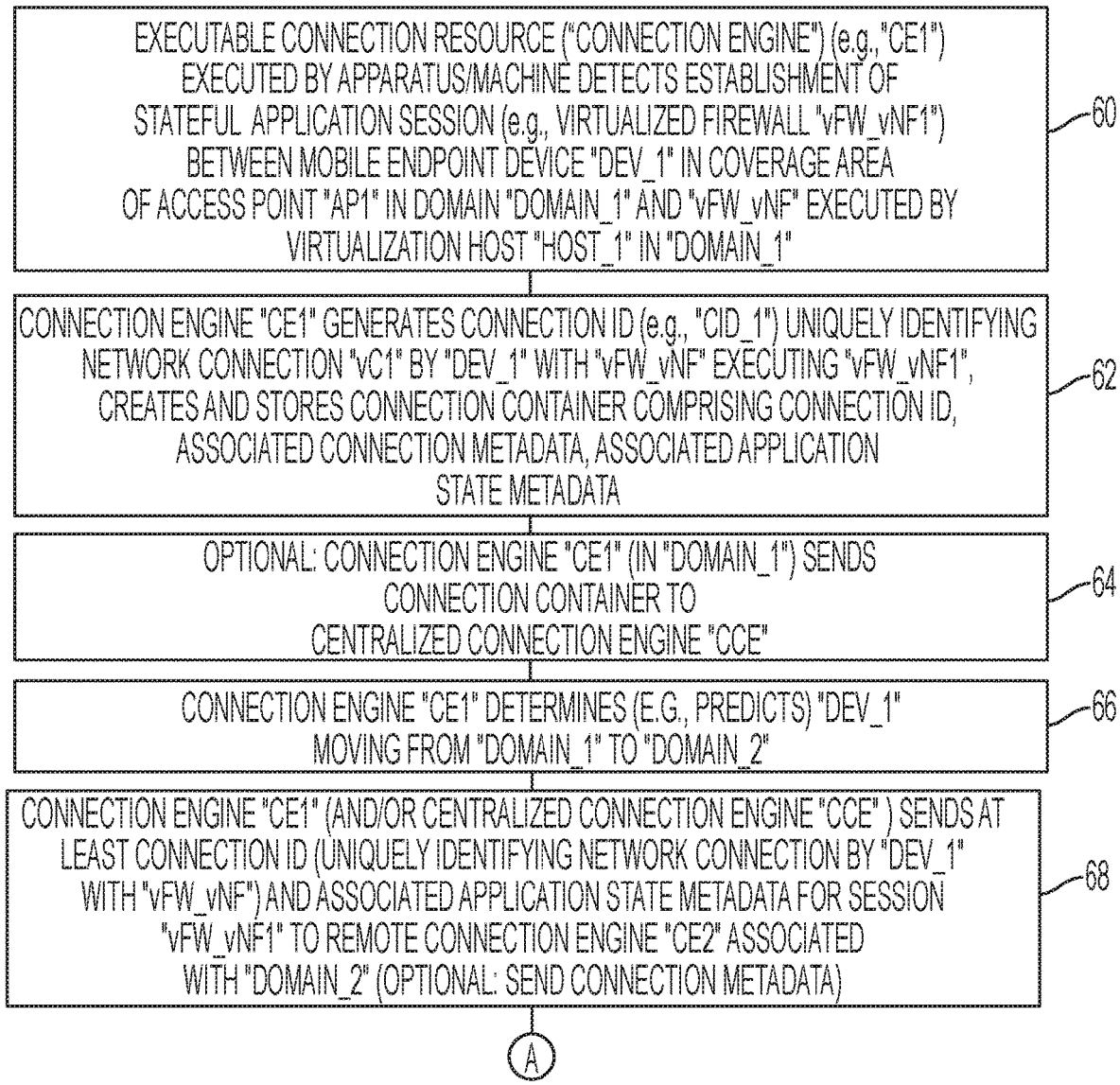
FIGS. 6A-6C illustrate an example method executed by one or more of the connection resources in FIGS. 1, 2, and/or 3, according to an example embodiment.
Figure 6B:
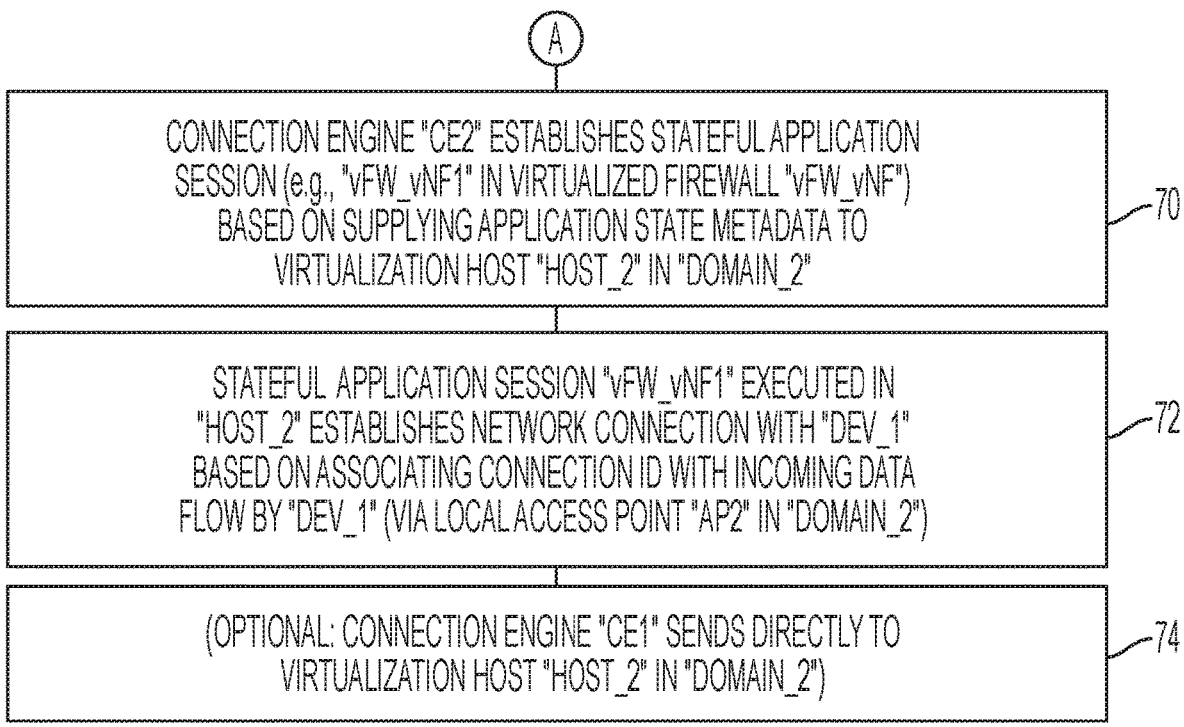
Figure 6C:
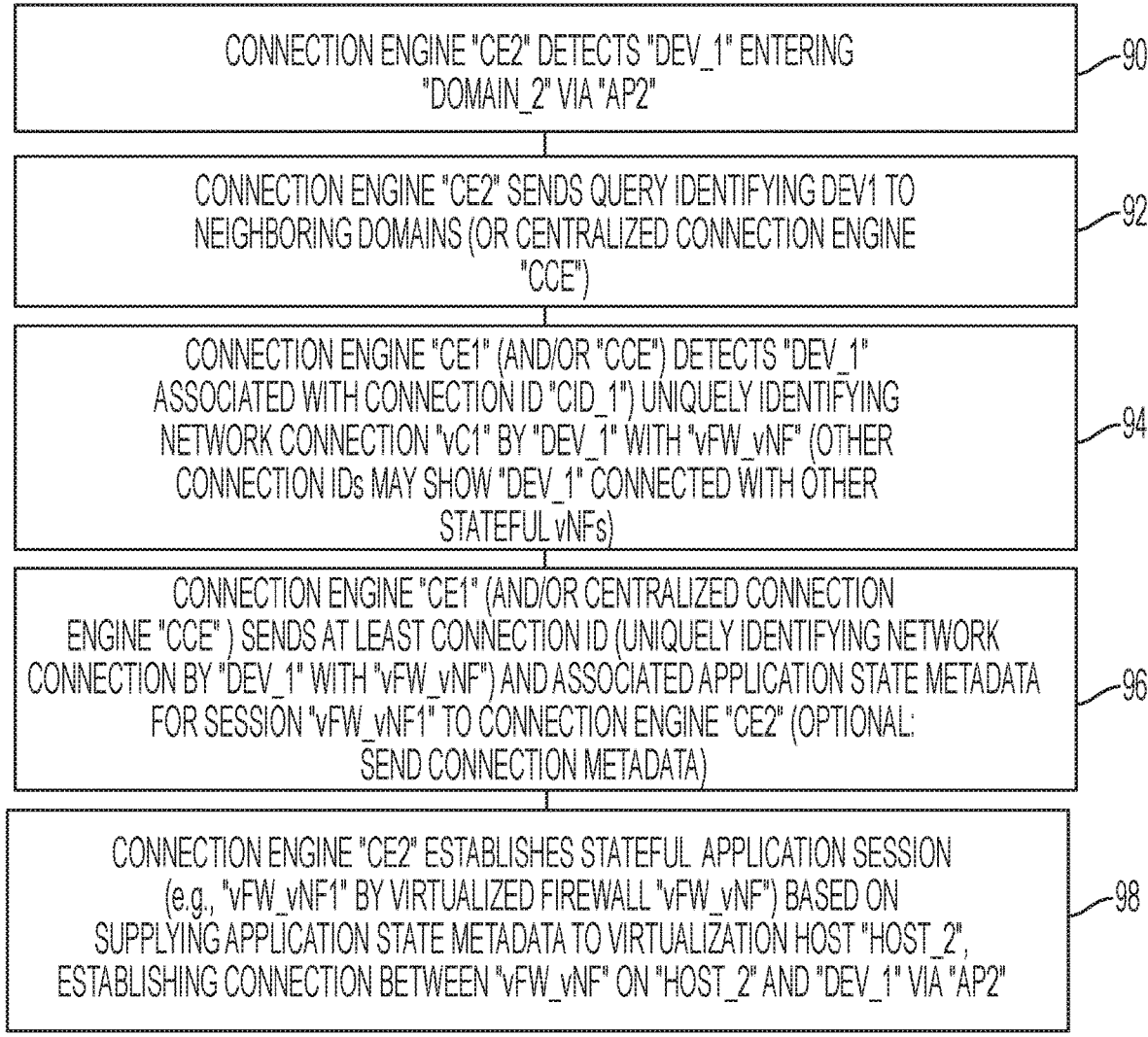

FIGS. 6A-6C illustrate an example method executed by one or more of the connection resources 32 in FIGS. 1, 2, and/or 3, according to an example embodiment. The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 6A, an executable connection resource 32 (e.g., "CE1" 32a of FIG. 1 executed by the processor circuit 52 of a virtualization host 22 in the physical data center 12a) in operation 60 can detect establishment of a stateful application session (e.g., a virtualized application instance "vFW_vNF1") of a stateful virtualized application (e.g., a virtualized firewall application "vFW_vNF") 24a between a mobile endpoint device (e.g., "DEV_1") 14a and the stateful virtualized application 24a. As described previously, the mobile endpoint device 14a can be located within the prescribed wireless coverage area 16a of the access point "AP1" (e.g., cell tower) 18a in the domain "DOMAIN_1" established by the edge cloud 24c. The edge cloud 24c (executed by the physical data center 12a) also can manage execution of the stateful virtualized application "vFW_vNF" 24a within the domain "DOMAIN_1" associated with the prescribed wireless coverage area 16a.

Figure 7:
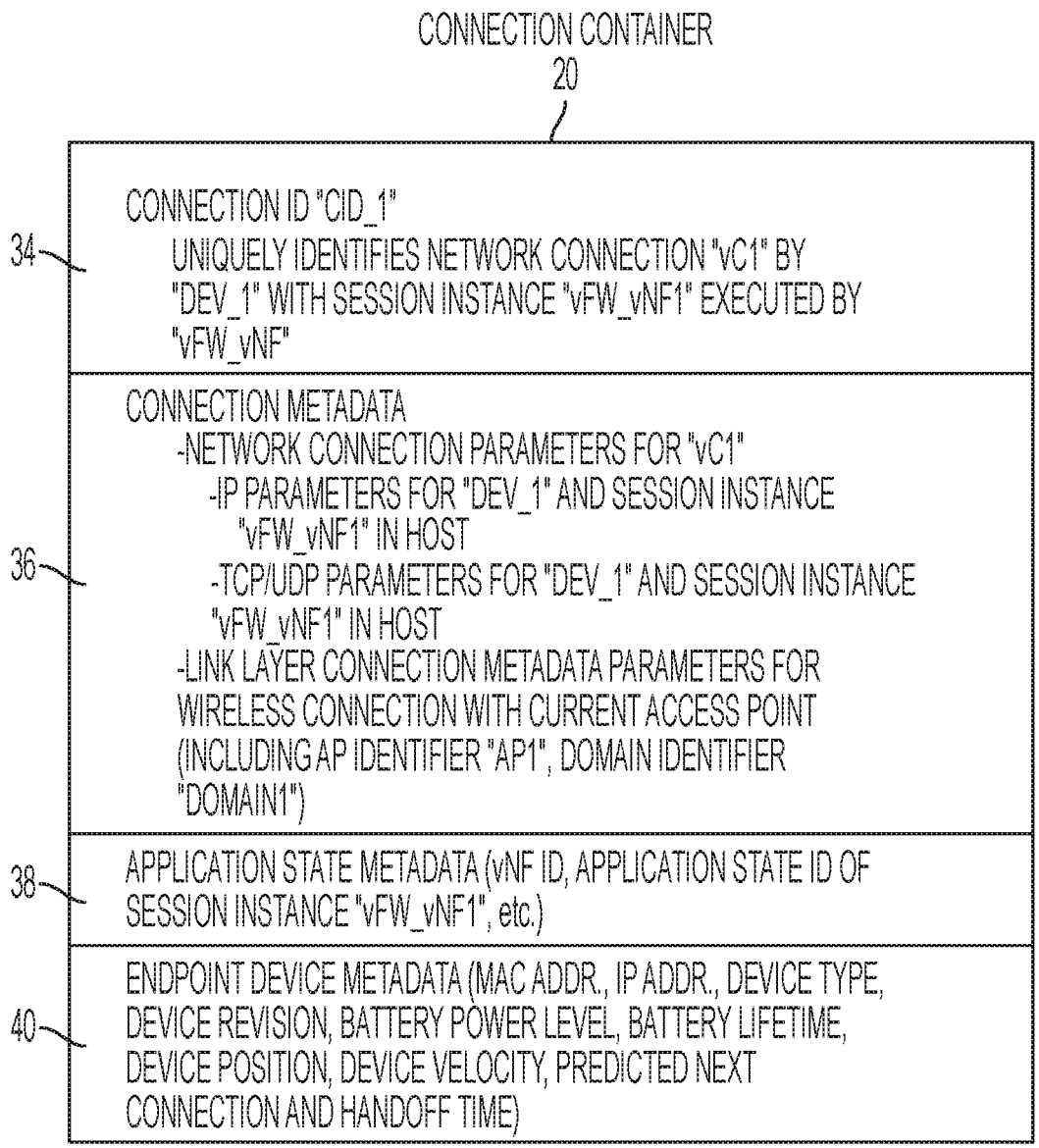
FIG. 7 illustrates an example connection container generated and updated by an apparatus in FIGS. 1 and/or 2, according to an example embodiment.

The processor circuit 52 of the virtualization host 22 executing the connection engine "CE1" 32a associated with the edge cloud 24c in operation 62 can generate the connection identifier, illustrated in FIGS. 1, 6A and 7 as "CID_1" 34: the connection identifier "CID_1" 34 is used to uniquely identify the network connection (e.g., "vC1") by the mobile endpoint device (e.g., "DEV_1") 14a associated with the application session instance "vFW_vNF1" executed by the stateful virtualized application "vFW_vNF" 24a; hence, the connection identifier "CID_1" 34 uniquely identifies a binding between the mobile endpoint device (e.g., "DEV_1") 14a, the specific application session instance "vFW_vNF1" executed for the mobile endpoint device 14a (as opposed to other application session instances "vFW_vNF2", "vFW_vNF3" executed for other mobile endpoint devices 14b, 14c, respectively, etc.), and the (virtualized) network-level connection "vC1" 26 that establishes communications between the mobile endpoint device (e.g., "DEV_1") 14a and the specific application session instance "vFW_vNF1" executed by the stateful virtualized application 24a.

The processor circuit 52 of the virtualization host 22 executing the connection engine "CE1" 32a associated with the edge cloud 24c in operation 62 also can create and store (in the memory circuit 54 of the virtualization host 22 of FIG. 5) a connection metadata container 20 (20a of FIG. 1) comprising the corresponding connection identifier "CID_1" 34, the associated connection metadata 36 as illustrated in FIG. 7, and the associated application state metadata 38. As illustrated in FIG. 7, the connection metadata 36 can include IP parameters for the mobile endpoint device 14a and the instance of the stateful application session executed by the stateful virtualized application 24a, TCP/UDP parameters, and link layer connection metadata parameters associated with the wireless connection 28a. The application state metadata 38 can include any metadata associated with the specific application state of the stateful application session instance "vFW_vNF1" executed by the stateful virtualized application 24a for the mobile endpoint device "DEV_1" 14a.

The processor circuit 52 of the virtualization host 22 executing the connection engine "CE1" 32a associated with the edge cloud 24c in operation 62 also can store device-specific information associated with the mobile endpoint device "DEV_1" 14a, for example MAC address, IP address, device type (e.g., sensor device, actuator device, mobile gateway, smart phone, smart tablet, etc.), device revision, battery power level and/or lifetime, device position (e.g., GPS coordinates) and/or device velocity, etc. The connection engine "CE1" 32a also can predict and store in the endpoint device metadata 40 a predicted next connection (e.g., an adjacent domain provided by the prescribed wireless coverage area 16b), and a predicted estimated time of arrival (ETA) (e.g., a predicted handoff time) for the mobile endpoint device "DEV_1" 14a.

The processor circuit 52 of the virtualization host 22 executing the connection engine "CE1" 32a associated with the edge cloud 24c in operation 64 can send at least a portion of the connection metadata container 20 (e.g., the connection identifier 34 and the associated application state metadata 38) to the centralized connection engine "CCE" 32c, for example in a hierarchical-based cloud-based computing system 10 where the centralized connection engine "CCE" 32c can provide centralized coordination and synchronization between the different connection resources 32 operating in different respective distinct domains.

As described previously, the processor circuit 52 of the virtualization host 22 executing the connection engine "CE1" 32a associated with the edge cloud 24c in operation 66 can determine (e.g., predict) that the mobile endpoint device "DEV_1" 14a is (or will be) moving from the current domain "DOMAIN_1" provided by the edge cloud 24c and the prescribed wireless coverage area 16a to another different domain "DOMAIN_2" provided by another edge cloud 24d executed by a different distinct physical data center 12b, for example at an ETA associated with the event 30. In one embodiment, the connection engine "CE1" 32a can send a notification that specifies updated metadata describing the movement of the mobile endpoint device "DEV_1" 14a, by the ETA associated with the event 30, to the connection engine "CE2" 32b in the neighboring domain "DOMAIN_2" provided by edge cloud 24d.

In response to detecting the movement of the mobile endpoint device "DEV_1" 14a from the domain "DOMAIN_1" executed by the physical data center 12a to the domain "DOMAIN_2" executed by the physical data center 12b, the connection resource 32a and/or the connection resource 32c in operation 68 can send at least a portion of the connection metadata container 20 having the connection identifier "CID_1" 34 uniquely identifying the network connection (e.g., "vC1") by the mobile endpoint device "DEV_1" 14a with the application session instance "vFW_vNF1" executed by the stateful virtualized application "vFW_vNF" 24a. As illustrated in FIG. 6A, the connection resource 32a and/or the connection resource 32c in operation 68 can send the connection identifier "CID_1" 34 (and associated metadata identifying the mobile endpoint device "DEV_1" 14a and application session instance "vFW_vNF1" executed by the stateful virtualized application "vFW_vNF", as appropriate), and the application state metadata 38, to the remote connection resource "CE2" 32b associated with the destination domain "DOMAIN_2" provided by edge cloud 24d. The connection resource 32a and/or the connection resource 32c also can send the connection metadata 36, as appropriate.

Referring to FIG. 6B, the processor circuit 52 of the virtualization host 22 executing the connection engine "CE2" 32b associated with the edge cloud 24d in operation 70 can receive at least a portion of the connection metadata container 20 established under the connection identifier "CID_1" 34, and in response the connection engine "CE2" 32b can establish a "mirror" instance of the stateful application session "vFW_vNF1" in the stateful virtualized application "vFW_vNF" 24b executed by a virtualization host 22 in the physical data center 12b. The connection engine "CE2" 32b can establish the "mirror" instance of the stateful application session "vFW_vNF1", based on supplying the connection metadata container 20 (or at least portion thereof associated with the connection identifier "CID_1" 34) to the virtualization host 22 in the physical data center 12b of the domain "DOMAIN_2" (or locally-executable orchestrator, as appropriate).

In response to the virtualization host 22 in the physical data center 12b instantiating the stateful application session "vFW_vNF1" in the stateful virtualized application 24b, the stateful application session "vFW_vNF1" in operation 72 can establish a network connection 26 with the mobile endpoint device "DEV_1" 14a as the mobile endpoint device 14a enters the prescribed wireless coverage area 16b. As apparent from the foregoing, the stateful application session "vFW_vNF1" in operation 72 (and/or the connection resource 32b) can send instructions and/or metadata to a virtualized router service (executed in the edge cloud 24d) that causes the virtualized router service to send an incoming data flow originated by the mobile endpoint device "DEV_1" 14a and received by the local access point "AP2" 18b to be forwarded to the stateful application session "vFW_vNF1" to establish the network connection 26.

As a variation of operation 68, operation 74 illustrates that the connection resource "CE1" also can send at least a portion of the connection metadata container 20 for the connection identifier "CID_1" 34 directly to the virtualization host 22 in the physical data center 12b executing destination connection resource "CE2", for example via a peer-to-peer data link 42.

Hence, the connection resource 32b causes the stateful virtualized application 24b to provide continuous execution of the stateful application session "vFW_vNF1" as the mobile endpoint device "DEV_1" 14a moves from the mobile endpoint device 14a to the mobile endpoint device 14b.

The example embodiments also enable a connection resource 32a and/or 32c to respond to a query originated another connection resource 32b. For example, assume in operation 90 that the connection resource "CE2" 32b detects the mobile endpoint device "DEV_1" 14a is entering the domain "DOMAIN_2" via prescribed wireless coverage area 16b provided by the wireless network access point device "AP2" 18. The connection resource "CE2" 32b in operation 92 can send a query to the connection resources 32 of neighboring domains, where the query can identify the "DEV_1" 14a by IP address, MAC address, QUIC identifier, etc., or by the connection identifier "CID_1" 34 if provided by the mobile endpoint device "DEV_1" 14a.

The connection resource "CE1" 32a and/or "CCE" 32c receiving the query can determine in operation 92 that the mobile endpoint device "DEV_1" 14a is associated with the connection identifier "CID_1" 34 (e.g., based on executing a search of locally-stored connection metadata containers 20 using the MAC address, IP address, QUIC identifier, etc. of the mobile endpoint device "DEV_1" 14a. The connection resource "CE1" 32a and/or "CCE" 32c in operation 94 can determine the connection identifier "CID_1" 34, the associated network connection "vC1" 26 used by the mobile endpoint device "DEV_1" 14a during the existing stateful application session "vFW_vNF1". The connection resource "CE1" 32a and/or "CCE" 32c also can identify other connection identifiers associated with other stateful application sessions executed by other stateful virtualized applications 24 (e.g., load balancer vNF, VPN vNF, etc.).

The connection resource "CE1" 32a and/or "CCE" 32c in operation 96 can respond to the query by sending to the requesting connection resource "CE2" 32b the connection metadata container 20 associated with the connection identifier "CID_1" 34, or at least the connection identifier "CID_1" 34 that uniquely identifies network connection "vC1" by the mobile endpoint device "DEV_1" 14a with the existing stateful application session "vFW_vNF1", and the associated application state metadata 38 describing the application state of the existing stateful application session "vFW_vNF1".

The connection resource "CE2" 32b in operation 98 can establish the stateful application session "vFW_vNF1" in the stateful virtualized application 24b executed by one of the virtualization hosts (e.g., "HOST_2") 22s in the physical data center 12b, based on the connection resource "CE2" 32b supplying the application state metadata 38 to the virtualization host "HOST_2" 22; the connection resource "CE2" 32b and/or the stateful application session "vFW_vNF1" executed in the stateful virtualized application 24b also can establish the network connection "vC1" 26 (e.g., based on sending an instruction to a local virtualized router service as described previously), resulting in the network connection 26 between the stateful application session "vFW_vNF1" executed in the stateful virtualized application 24b on the virtualization host "HOST_2" 22, and the mobile endpoint device "DEV_1" 14a via the wireless network access point device "AP2" 18b.

According to example embodiments, a metadata-based connection resource can share metadata dynamically and on-demand across multiple distinct computing domains in a virtualized network, based on determined behaviors of a mobile endpoint device. The example embodiments cause continuous execution of stateful virtualized applications for a mobile endpoint device as the mobile endpoint device moves between the distinct computing domains. The example embodiments enable distributed coordination and synchronization of metadata associated with virtualized services provided to the mobile endpoint device, including connection state and application state, ensuring a "seamless" transition between different network domains that can guarantee a continuous execution of a stateful application session as the mobile endpoint device moves between different computing domains. The example embodiments also enable different metadata types to be combined within a single container having a connection identifier that uniquely identifies the network connection by the mobile endpoint device with the stateful virtualized application; hence, the example embodiments can cause continuous execution of stateful virtualized applications for the mobile endpoint device, even as the mobile endpoint device moves between different types of computing domains using different metadata types in a heterogeneous data network.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    detecting, by an apparatus, establishment of a stateful application session between a mobile endpoint device and a stateful virtualized application executed by a first virtualization host in a data network, the mobile endpoint device establishing a network connection with the stateful virtualized application via a first wireless connection with a first network access point in the data network;
    generating, by the apparatus, a connection container comprising a connection identifier uniquely identifying the network connection by the mobile endpoint device with the stateful virtualized application, connection metadata associated with the connection identifier and describing the network connection and the first wireless connection, and application state metadata describing execution of the stateful virtualized application for the mobile endpoint device;
    predicting by the apparatus, while the mobile endpoint device is connected with the first network access point via the first wireless connection and prior to the mobile endpoint device establishing a wireless connection with a second network access point, an estimated time of arrival that identifies a future event of the mobile endpoint device connecting with the second network access point and disconnecting from the first network access point; and
    generating and outputting, by the apparatus based on predicting the future event, a movement notification that specifies the estimated time of arrival, the connection identifier, and the associated application state metadata, the movement notification causing a second virtualization host associated with the second network access point to provide continuous execution of the stateful virtualized application as the mobile endpoint device connects with the second network access point.

2. The method of claim 1, wherein:
    the first virtualization host is associated with the first network access point and not the second network access point;
    the generating including adding, into the connection container, device metadata describing the mobile endpoint device and the estimated time of arrival of connecting with the second network access point.

3. The method of claim 1, further comprising receiving at least a portion of the application state metadata from the stateful virtualized application during execution thereof by the first virtualization host.

4. The method of claim 1, further comprising receiving at least a portion of the connection metadata from any one or more of the mobile endpoint device or the stateful virtualized application during execution thereof.

5. The method of claim 1, wherein:
    the generating is executed by a first connection resource executed in the apparatus;
    the outputting comprises the first connection resource outputting the connection identifier and the associated application state metadata to at least one of a second connection resource executed by a second apparatus associated with the second network access point, or a centralized connection resource executed by a third apparatus and that is configured for communication with the second connection resource.

6. The method of claim 1, wherein:
    the stateful virtualized application is a virtualized network function;
    the method further comprising receiving, from any one of the second virtualization host or the second network access point, a query identifying the mobile endpoint device, the outputting including outputting the connection identifier and the associated application state metadata to any one or more of the second virtualization host or the second network access point in response to the query.

7. The method of claim 1, wherein the predicting includes updating the connection container to specify the estimated time of arrival and a corresponding predicted next connection to the second network access point.

8. An apparatus implemented as a physical machine, the apparatus comprising:
    non-transitory machine readable media configured for storing executable machine readable code;
    a device interface circuit configured for receiving sending and receiving data via a data network; and
    a processor circuit configured for executing the machine readable code, and when executing the machine readable code operable for:
    detecting establishment of a stateful application session between a mobile endpoint device and a stateful virtualized application executed by a first virtualization host in the data network, the mobile endpoint device establishing a network connection with the stateful virtualized application via a first wireless connection with a first network access point in the data network,
    generating a connection container comprising a connection identifier uniquely identifying the network connection by the mobile endpoint device with the stateful virtualized application, connection metadata associated with the connection identifier and describing the network connection and the first wireless connection, and application state metadata describing execution of the stateful virtualized application for the mobile endpoint device,
    predicting, while the mobile endpoint device is connected with the first network access point via the first wireless connection and prior to the mobile endpoint device establishing a wireless connection with a second network access point, an estimated time of arrival that identifies a future event of the mobile endpoint device connecting with the second network access point and disconnecting from the first network access point, and
    generating and outputting, based on predicting the future event, a movement notification that specifies the estimated time of arrival, the connection identifier, and the associated application state metadata, the movement notification causing a second virtualization host associated with the second network access point to provide continuous execution of the stateful virtualized application as the mobile endpoint device connects with the second network access point.

9. The apparatus of claim 8, wherein:
the first virtualization host is associated with the first network access point and not the second network access point;
the processor circuit configured for adding, into the connection container, device metadata describing the mobile endpoint device and the estimated time of arrival of connecting with the second network access point.

10. The apparatus of claim 8, wherein the device interface circuit is configured for receiving at least a portion of the application state metadata from the stateful virtualized application during execution thereof by the first virtualization host.

11. The apparatus of claim 8, wherein the device interface circuit is configured for receiving at least a portion of the connection metadata from any one or more of the mobile endpoint device or the stateful virtualized application during execution thereof.

12. The apparatus of claim 8, wherein:
execution of the machine readable code by the processor circuit creates an executable instance of a first connection resource;
the first connection resource executed by the processor circuit is configured for outputting, via the device interface circuit, the connection identifier and the associated application state metadata to at least one of a second connection resource executed by a second apparatus associated with the second network access point, or a centralized connection resource executed by a third apparatus and that is configured for communication with the second connection resource.

13. The apparatus of claim 8, wherein:
the stateful virtualized application is a virtualized network function;
the processor circuit is configured for receiving from any one of the second virtualization host or the second network access point, via the device interface circuit, a query identifying the mobile endpoint device, the processor circuit configured for outputting the connection identifier and the associated application state metadata to any one or more of the second virtualization host or the second network access point in response to the query.

14. The apparatus of claim 8, wherein the predicting includes updating the connection container to specify the estimated time of arrival and a corresponding predicted next connection to the second network access point.

15. One or more non-transitory tangible media encoded with logic for execution by a machine and when executed by the machine operable for:
detecting, by the machine, establishment of a stateful application session between a mobile endpoint device and a stateful virtualized application executed by a first virtualization host in a data network, the mobile endpoint device establishing a network connection with the stateful virtualized application via a first wireless connection with a first network access point in the data network;
generating, by the machine, a connection container comprising a connection identifier uniquely identifying the network connection by the mobile endpoint device with the stateful virtualized application, connection metadata associated with the connection identifier and describing the network connection and the first wireless connection, and application state metadata describing execution of the stateful virtualized application for the mobile endpoint device;
predicting, by the machine while the mobile endpoint device is connected with the first network access point via the first wireless connection and prior to the mobile endpoint device establishing a wireless connection with a second network access point, an estimated time of arrival that identifies a future event of the mobile endpoint device connecting with the second network access point and disconnecting from the first network access point; and
generating and outputting, by the machine based on predicting the future event, a movement notification that specifies the estimated time of arrival, the connection identifier, and the associated application state metadata, the movement notification causing a second virtualization host associated with the second network access point to provide for continuous execution of the stateful virtualized application as the mobile endpoint device connects with the second network access point.

16. The one or more non-transitory tangible media of claim 15, wherein:
the first virtualization host is associated with the first network access point and not the second network access point;
the generating including adding, into the connection container, device metadata describing the mobile endpoint device and the estimated time of arrival of connecting with the second network access point.

17. The one or more non-transitory tangible media of claim 15, further operable for receiving at least a portion of the connection metadata from any one or more of the mobile endpoint device or the stateful virtualized application during execution thereof.

18. The one or more non-transitory tangible media of claim 15, wherein:
the generating is executed by a first connection resource in the machine;
the outputting comprises the first connection resource outputting the connection identifier and the associated application state metadata to at least one of a second connection resource executed by a second machine associated with the second network access point, or a centralized connection resource executed by a third machine and that is configured for communication with the second connection resource.

19. The one or more non-transitory tangible media of claim 15, wherein:
the stateful virtualized application is a virtualized network function;
the one or more non-transitory tangible media further operable for receiving, from any one of the second virtualization host or the second network access point, a query identifying the mobile endpoint device, the outputting including outputting the connection identifier and the associated application state metadata to any one or more of the second virtualization host or the second network access point in response to the query.

20. The one or more non-transitory tangible media of claim 15, wherein the predicting includes updating the connection container to specify the estimated time of arrival and a corresponding predicted next connection to the second network access point.

* * * * *

UNITED STATES PATENT AND TRADEMARK OFFICE
CERTIFICATE OF CORRECTION

PATENT NO. : 10,893,108 B2  
APPLICATION NO. : 16/352474  
DATED : January 12, 2021  
INVENTOR(S) : Jeuk et al.

Page 1 of 1

It is certified that error appears in the above-identified patent and that said Letters Patent is hereby corrected as shown below:

In the Claims

Column 18, Claim 8, Line 5, delete "for receiving sending" and insert --for sending-- therefor Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*